US011461825B2

(12) United States Patent
Ahi

(10) Patent No.: US 11,461,825 B2
(45) Date of Patent: Oct. 4, 2022

(54) ARTIFICIAL INTELLIGENCE BASED IOT SYSTEM FOR MANAGING AND OPTIMIZING SHOPPING LISTS, PURCHASED ITEMS, SHOPPING VISITS, DELIVERY SCHEDULES AND REDUCING FOOD WASTE

(71) Applicant: Kiarash Ahi, San Jose, CA (US)

(72) Inventor: Kiarash Ahi, San Jose, CA (US)

( * ) Notice: Subject to any disclaimer, the term of this patent is extended or adjusted under 35 U.S.C. 154(b) by 0 days.

(21) Appl. No.: 16/812,264

(22) Filed: Mar. 6, 2020

(65) Prior Publication Data

US 2020/0286157 A1    Sep. 10, 2020

Related U.S. Application Data

(60) Provisional application No. 62/814,297, filed on Mar. 6, 2019.

(51) Int. Cl.
| | | |
|---|---|---|
| *G06Q 30/00* | (2012.01) | |
| *G06Q 30/06* | (2012.01) | |
| *G06Q 30/02* | (2012.01) | |
| *H04W 4/029* | (2018.01) | |
| *G06Q 10/08* | (2012.01) | |
| *G06N 20/00* | (2019.01) | |

(52) U.S. Cl.
CPC ......... *G06Q 30/0633* (2013.01); *G06N 20/00* (2019.01); *G06Q 10/087* (2013.01); *G06Q 30/0255* (2013.01); *G06Q 30/0261* (2013.01); *G06Q 30/0631* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 8,810,392 B1* | 8/2014 | Teller | G08B 21/24 340/539.32 |
| 9,965,798 B1* | 5/2018 | Vaananen | F25D 27/005 |
| 2014/0052573 A1* | 2/2014 | Oh | G06Q 30/0633 705/26.8 |
| 2016/0314514 A1* | 10/2016 | High | G06Q 30/0641 |
| 2017/0076361 A1* | 3/2017 | Levesque | G06Q 30/0639 |
| 2018/0137462 A1* | 5/2018 | Zohar | G06N 20/00 |
| 2018/0266751 A1* | 9/2018 | Lim | F25D 29/00 |
| 2019/0165967 A1* | 5/2019 | Wallace | G06Q 10/087 |

* cited by examiner

*Primary Examiner* — Mila Airapetian

(57) ABSTRACT

A system comprising methods and apparatuses is provided for managing and optimizing shopping lists, purchased items, shopping visits, delivery schedules and reducing food waste. This system stores shopping lists of a user or shopping lists shared between a group of users. Upon entering the user to a certain vicinity where there is a store that sells an item which is pending on the shopping lists, the system sends reminding alerts to the user. Upon checking out from the store, the system marks as purchased on the shopping lists the purchased items. Upon storing the purchased items in associated containers, the system stores the locations of the items and updates the remaining amount of each of the items each time the user consumes part of each item. The system predicts the most optimized time of purchase and amount of the items to be purchased such that the least amount of food waste would occur and the least amount of delivery or shopping trips would be needed.

19 Claims, 6 Drawing Sheets

Figure 1:
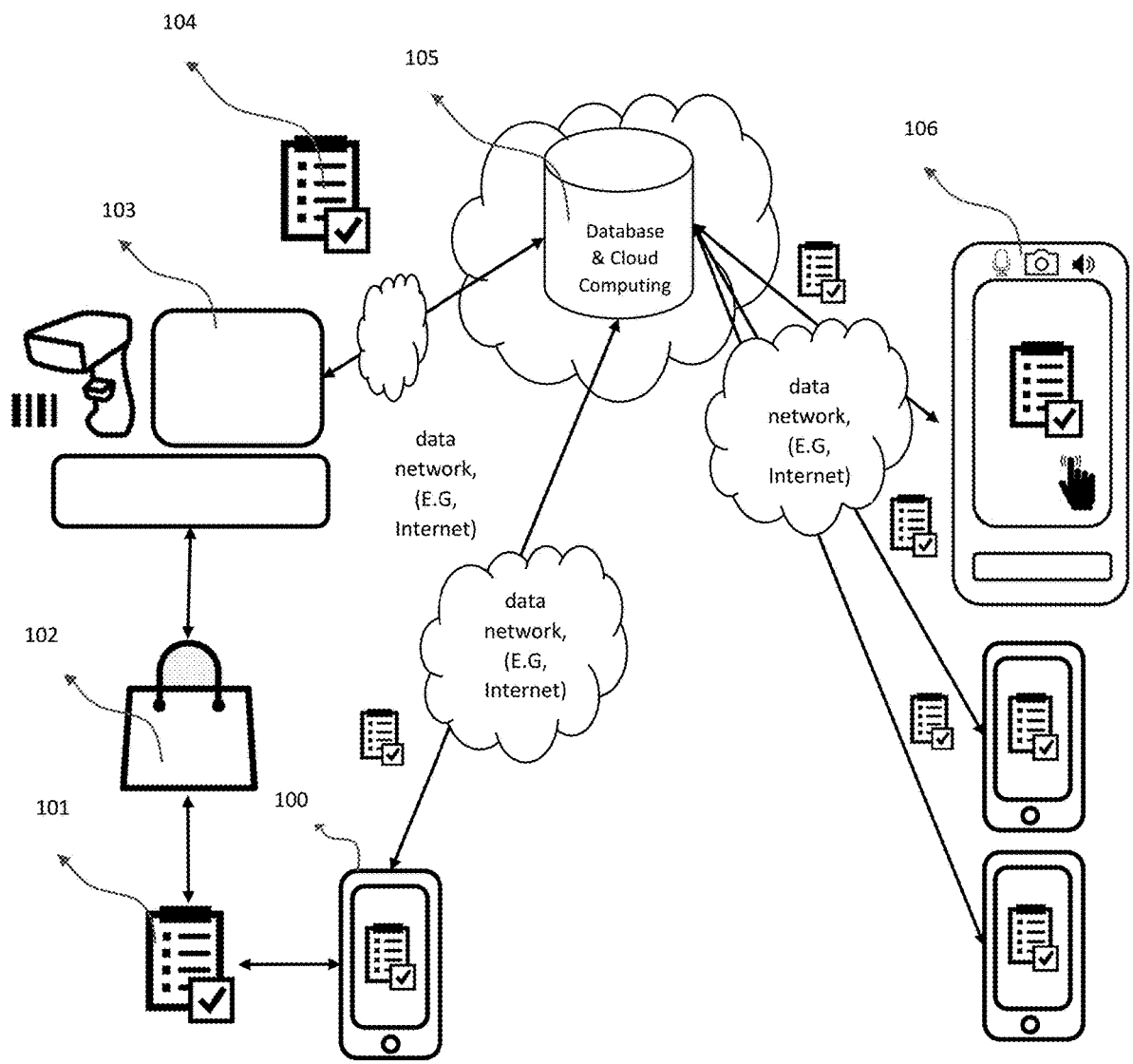

ARTIFICIAL INTELLIGENCE BASED IOT SYSTEM FOR MANAGING AND OPTIMIZING SHOPPING LISTS, PURCHASED ITEMS, SHOPPING VISITS, DELIVERY SCHEDULES AND REDUCING FOOD WASTE

CROSS REFERENCE TO A RELATED APPLICATION

This application claims the benefit of provisional application Ser. No. 62/814,297, filed Mar. 6, 2019 by the present inventor.

FIELD OF INVENTION

The technology relates generally to the electronic systems, and more particularly, management of good and/or services.

Field of Search: 235/385,375; 705/28,22;

BACKGROUND

Prior Art

The following is a tabulation of some prior art that presently appears relevant:

| U.S. Patents | | |
| --- | --- | --- |
| Pat. No. | Issue Date | Patentee |
| 9,412,086 | Aug. 9, 2016 | Morse, et al. |
| 9,760,856 | Sep. 12, 2017 | Chouhan, et al. |
| 6,483,695 | November 2002 | Harstein, et al. |
| 6,513,017 | January 28, | Howard, et al. |
| 7,065,501 | June 2006 | Brown, et al |
| 7,930,221 | April 2011 | Brown, et al. |
| 8,538,829 | September 2013 | Hu, et al. |
| 6,204,763 | March 2001 | Sone, et al. |
| 8,249,946 | August 2012 | Froseth, et al. |
| 10/018402B2 | 2018 Jul. 10 | Sumihiro, et al. |
| 99/49576B2 | 2018 Apr. 24 | GIULIETTI, et al. |
| U.S. 10/027866B2 | 2018 Jul. 17 | Carlotto, et al. |

Background Art

Traditionally, shoppers prepare shopping lists on pieces of paper and check the purchased items off once they purchased them. Such paper-based scheme makes it impossible to update the shopping lists that are shared between the members of a household in a real-time manner. Recent advances in electronic devices has made sharing and real-time updating of the shopping lists possible. However, the users of such lists might forget that they have a shopping list and forget to purchase the items that are on the shopping list when they enter a store, or its vicinity. They might not be aware that the store, or its vicinity, that they entered sells the items or not. The process of checking off the purchased items are still manual. The shopping lists are not dynamically and are not automatically updated based on the amount of the previously purchased items that are still remaining at the user s storage. The users might forget what they have already purchased and purchase it multiple times. And, there is no optimization system for advising the user about the optimized amount of the items, and the right time, to purchase toward reducing the frequency of shopping visits, and online deliveries, and its associated fuel and time, food waste, nutrition, the total amount of the price and so on.

Technical Problem

Although the electronic infrastructures and components are advanced enough to host a universal optimization and management system for managing and optimizing the purchased items of an entity, such as a household, and associated costs with that, there is no universal system for connecting the shopping lists, lists of purchased items, keeping track of the expiration dates and remaining amount of the purchased items, planning the shopping trips for reducing the total price in terms of fuel and the costs of the items in different stores, and ordering online with the most optimized delivery schedules.

Solution to Problem in Prior Art (1) Using paper shopping lists. Keeping track of the purchased items and expiration dates on paper lists and manual calculations of the discounts and spending.

(2) Shared electronic shopping lists, that can be shared between members of a households.

(3) Using barcode readers to keep track of objects in the supply chain from manufacturer to the recycler and placing barcode readers at the doors of the refrigerators to track the items.

(4) Using cameras inside and at the sides of the refrigerators. However, use of cameras outside the refrigerator, might raise privacy issues. That will still be the case for the case of using cameras inside the refrigerator. In addition, the items inside the refrigerator might be placed on top of each other and hence, it will be impossible to perform object recognition. That is also the case for the items that are in the plastic containers, homemade foods, and the leftovers that are placed in the refrigerator.

Solution to Problem

This disclosure presents a novel system wherein the cycle of creating shopping lists and keeping track of the purchased items are centralized in one system toward achieving an optimized scheme of shopping and online delivery. This system matches items on the shopping lists to the items that stores sell and alerts the user when the user enters a store, or its vicinity, that sells the pending items on the user's shopping lists. Upon checking out from the store, the items on the shopping lists that are purchased in that shopping event, are checked off as "purchased". The shared shopping lists by a group of users, (that are for exemplary purpose, not limiting, are called household members in this disclosure), are updated by the system as well. Upon checking out from the store, the purchased items are automatically allocated into sub-lists. These sub lists are associated with the places (containers, or storages) that the purchased items will be stored within a household. Accompanying information, such as expiration dates, date of purchase, owner of the item, price, and so on, might also accompany the items in the lists. Upon arrival of the items to the associated containers, for storage, the items on the sub-lists will be confirmed to be placed in their associated locations, (that for exemplary purpose, not limiting can be within the household). When the user consumes a store item or part of it, the lists will be updated. If the items are not used and expiration dates are close, the user will receive reminds. If the user takes out an item that is expired or belongs to another user within a household, warnings will be sent to the user or associated users. The system is capable of ordering online, or add to the shopping lists the items that are about to finish or are finished. The system, is capable of predicting the amount of the items that are consumed by the household and optimizing the total cost of shopping, travelling, or delivery. The system recommends right time of ordering online or right time of adding the items to the shopping lists toward optimization of the mentioned parameters.

SUMMARY

This disclosure presents a novel system wherein the cycle of creating shopping lists and keeping track of the purchased items are centralized in one system toward achieving an optimized scheme of shopping and online delivery. This system matches items on the shopping lists to the items that stores sell and alerts the user when the user enters a store, or its vicinity, that sells the pending items on the user's shopping lists. Upon checking out from the store, the items on the shopping lists that are purchased in that shopping event, are checked off as "purchased". The shared shopping lists by a group of users, (that are for exemplary purpose, not limiting, are called household members in this disclosure), are updated by the system as well. Upon checking out from the store, the purchased items are automatically allocated into sub-lists. These sub lists are associated with the places (containers, or storages) that the purchased items will be stored within a household. Accompanying information, such as expiration dates, date of purchase, owner of the item, price, and so on, might also accompany the items in the lists. Upon arrival of the items to the associated containers, for storage, the items on the sub-lists will be confirmed to be placed in their associated locations, (that for exemplary purpose, not limiting can be within the household). When the user consumes a store item or part of it, the lists will be updated. If the items are not used and expiration dates are close, the user will receive reminds. If the user takes out an item that is expired or belongs to another user within a household, warnings will be sent to the user or associated users. The system is capable of ordering online, or add to the shopping lists the items that are about to finish or are finished. The system, is capable of predicting the amount of the items that are consumed by the household and optimizing the total cost of shopping, travelling, or delivery. The system recommends right time of ordering online or right time of adding the items to the shopping lists toward optimization of the mentioned parameters.

Advantages

Accordingly, several advantages of one or more aspects are as follows: to provide a system and process for organizing and optimizing household shopping schedules toward reduction of food waste and optimization of fuel consumption for shopping trips, supply chain and online deliveries.

The system has additional advantages such as, reminding the users about their pending shopping lists when they enter a store that sells the items on the shopping lists. Automatically checking off from the shopping list the items that are purchased in a shopping event. Creating lists of purchased items based on the associated places (containers) that the purchased items will be stored within a household. Storing accompanying information, such as expiration dates, date of purchase, owner, price of the items, and so on. Updating the lists dynamically upon consumption of the items. Sending notifications to the user about expiration dates of the stored items. Sending warnings when the user takes out from an associated container an expired item, or an item that belongs to another user. Ordering online, or add to the shopping list, the items that are about to finish or are finished. Predicting the amount of the items that are consumed by the household and optimizing the total cost of shopping, travelling, or delivery, through recommending right time of ordering online or right time of adding the items to the shopping lists. Suggesting recipes for the best use of the remaining food within the household. Creating shopping lists automatically and suggesting the ingredients to purchase based on the meals that the household plans to make, or based on the history of their meal plans and shopping habits. The term "household" in this disclosure can also be extended to any organization, restaurant, company, or entity that purchases items, use them, and/or store them.

Other advantages of one or more aspects will be apparent from a consideration of the drawings and ensuring description.

DRAWINGS—FIGURES

In the drawings, closely related figures have the same number but different alphabetic suffixes.

FIG. 1. Illustrates a block diagram of the disclosed system and process flow that includes a central database and cloud computing for computations, tracking, optimization, sharing and real-time updating the shopping lists, and purchase lists among members of a household and sending notifications.

Figure 2:
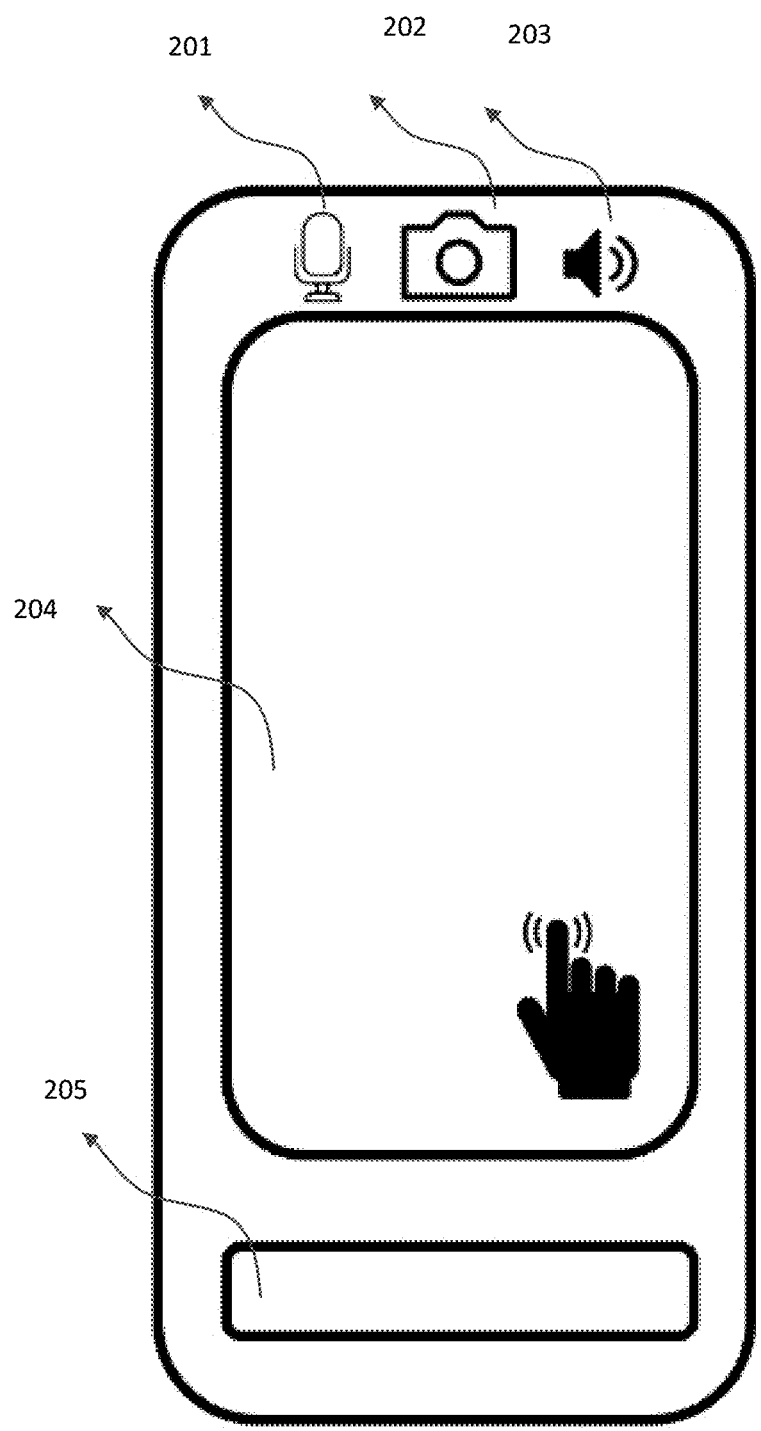
Figure 2:
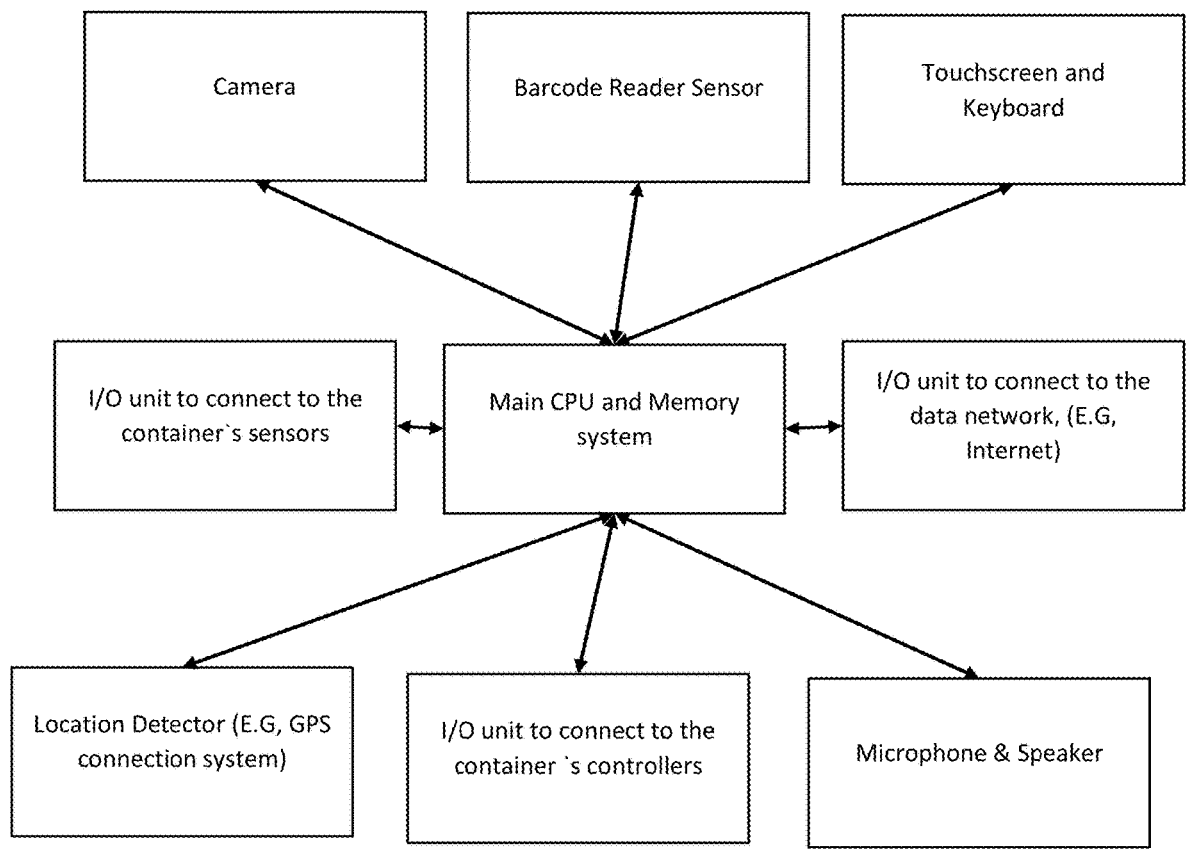

FIG. 2 A. Illustrates a schematic view of an apparatus that is specifically designed to keep track of the shopping lists, purchased items, send notifications, and communicating with the users.

FIG. 2 B. Illustrates a schematic architecture and peripheral components of the apparatus of FIG. 2 A.

Figure 3:
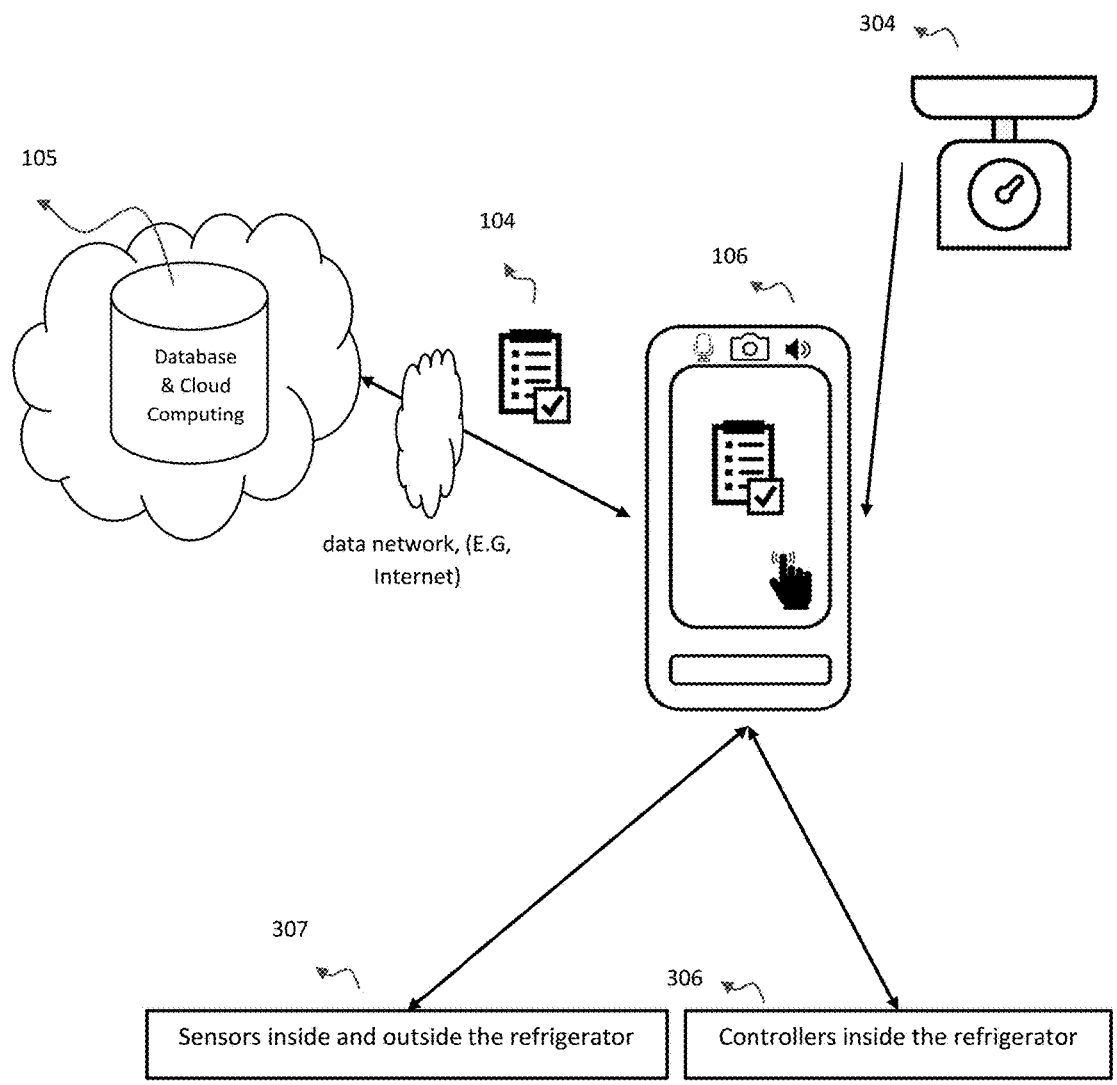
Figure 3:
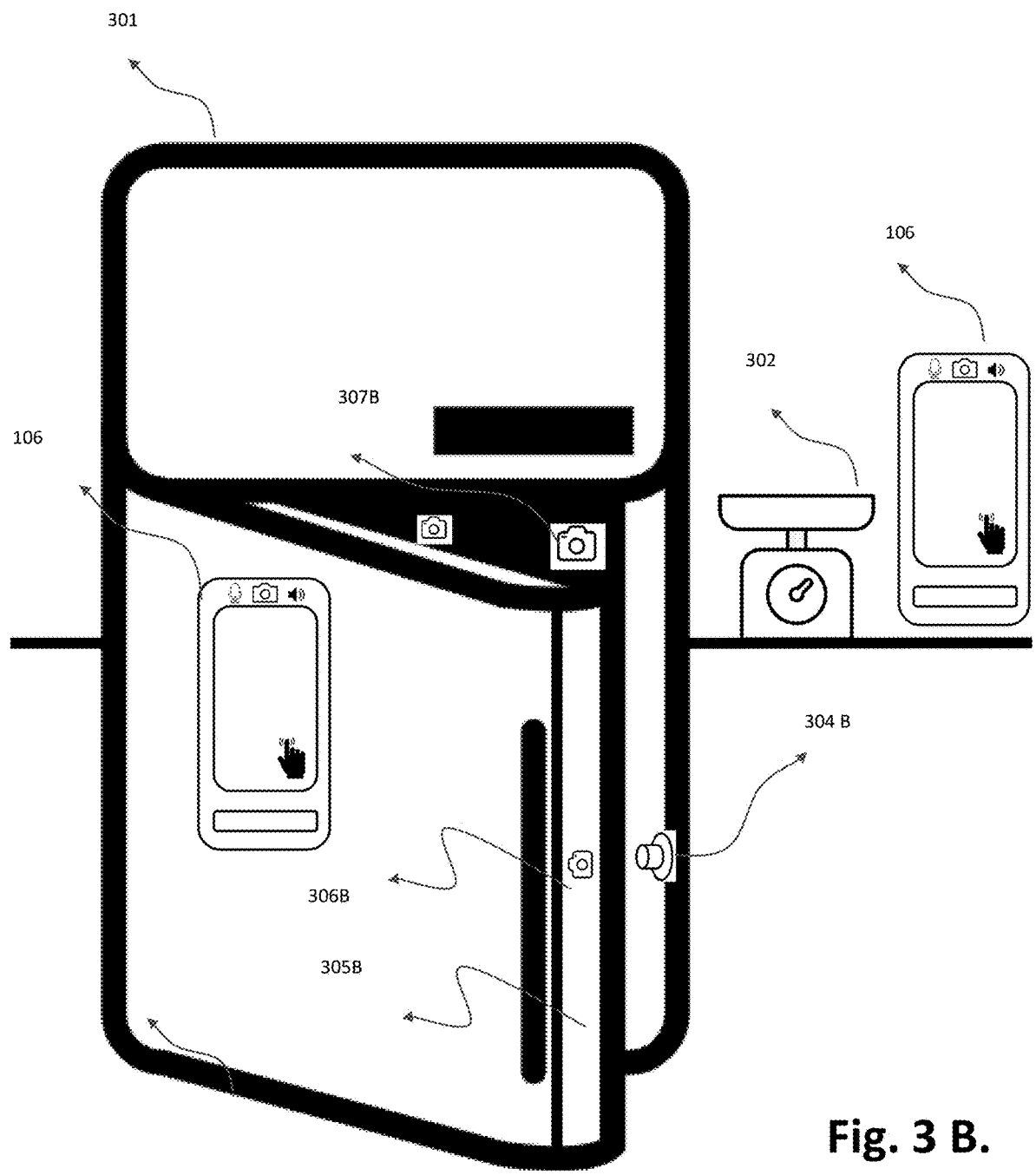

FIG. 3 A. Illustrates a schematic view of the interactions of the apparatus of FIG. 2 A. with some other elements of the disclosed system.

FIG. 3 B. Illustrates an exemplary embodiment of the apparatus of FIG. 2 A. with some other elements of the disclosed system.

Figure 4:
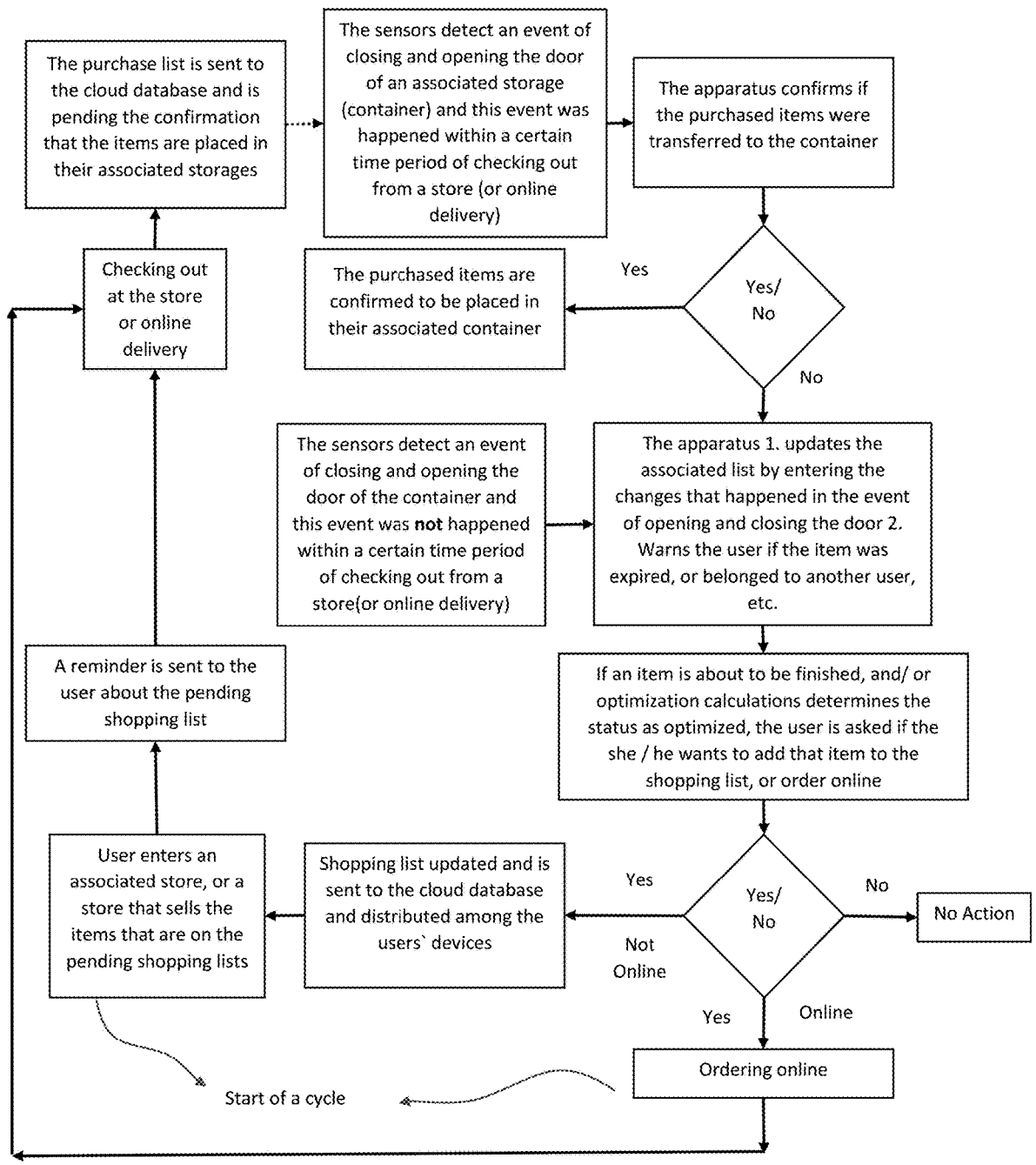

FIG. 4. Illustrates a flowchart through which the disclosed system operates

DRAWINGS—REFERENCE NUMERALS

100 Portable computation devices that carry the user-interface of the disclosed system and include peripherals to communicate with the user, detect location, and communicate to the central database and cloud computing elements of the disclosed system.

101 Schematic illustration of a shopping list that is stored in the database and is shared with users through the user-interface.

102 Schematic illustration of the purchased items by the user

103 Schematic illustration of cashier unit and checking out from the store

104 Schematic illustration of the list of purchased items that is sent to the central database and cloud computing element of the disclosed system for further processing.

105 Schematic illustration of the central database and cloud computing elements of the disclosed system

106 Schematic illustration of an apparatus that is designed for carrying the user-interface of the disclosed system, and has peripherals to communicate with the user, detect location, collect information about the state of consumption of the purchased items, collect data from the sensors of the containers that the items are stored in, control the ambient condition of the containers that the items are stored in, communicate to the central database and cloud computing elements of the disclosed system.

201 Schematic illustration of a microphone to receive the user voice and/or scan the ambient sounds.

202 Schematic illustration of the camera for scanning the barcodes, taking images of the items and sending them to the computation unit for object recognition and/or storing the data.

203 Schematic illustration of a speaker for communicating to the user and sending notifications.

204 Schematic illustration of a touchscreen for showing the user notifications, lists of stored items, shopping lists, and receiving the user inputs.

205 is a barcode scanner, scanning the barcodes can also be accomplished by the use of cameras, hence this part is not a necessity if cameras are included.

306 Sensors inside and outside the refrigerator

307 Controllers inside the refrigerator

301 B is a container that the purchased items, or a subset of them, are stored in. For exemplary purpose, but not limiting, the container is illustrated as a refrigerator here. The word "refrigerator" is used for exemplary purpose, but not limiting, and can be replaced by "container" throughout this disclosure.

302 B is a scale that is connected to 106 and sends measurement data to the system

304 B is a switch which status changes through opening the door of the refrigerator

305 B is the door of the refrigerator

306 B cameras at the side of the door of the refrigerator

307 B cameras inside the refrigerator

DETAILED DESCRIPTION OF THE INVENTION: OPERATION AND DESCRIPTION OF THE PROCESS

FIG. 1 A. illustrates the block diagram of the disclosed system. 100 illustrates the beginning of one cycle. When the user enters a store, or its vicinity, the computation unit of the system that constantly is matching the items that are on the user's shopping lists and what the stores that are within a certain distance from the user sells, sends a reminder to the user that there are pending items that can be purchased from a nearby store, or a store that the user has already entered to. (The central cloud computing element of the system, scans the location of the user, detects if there is any correlation between the items on the shopping lists and the nearby stores, and if yes, sends reminders to the user.) Certain stores can also be manually associated with a shopping list by the user so that when the user enters those stores, or its vicinity, reminders will be sent to the user. When the user checks out from the store, the shopping bill is sent to the central data base and computation system. The central computation system updates the shopping list by checking off from the shopping lists the items that are purchased within a shopping event. The central computation system creates new sub-lists based on the places or containers that the purchased items will be stored by the user within a household. The term "household" is used here for explanatory reason not limiting purpose; besides a "household" the disclosed system can be applied to entities such as a group of roommates, companies, restaurants, and so on. When the purchased items are arrived to their associated containers, the items in sub-lists are confirmed to be stored in their associated containers. The process of confirmation can be done by the user manually, by scanning the barcodes through 100, or 106, by use of cameras and object detection, and so on. Thanks to the recent advancements in the portable electronic devices and particularly smartphones, these devices contain the modules that are necessary for carry the user-interface of the disclosed system and allow the user to interact with the system of this disclosure, hence 100 is an illustrative view of a smartphone. 106 is a more specific apparatus, designed for this system, that carry the modules that are necessary toward achieving full capabilities of the system of this disclosure. If due to economic considerations, users refuse to obtain 106, they can benefit from many of the capabilities of the system by using regular voice assistance systems and/or smartphones. An illustrative view of 106 is depicted in FIG. 2. A. 201 is a microphone to receive the user voice and also to scan the ambient sounds. Through this microphone the event of opening and closing of the door of the container and its duration can be sensed, detected, and/or recorded. If the event of opening and closing of the door of the container happens within a certain duration of time after the checking out from the store has happened, and/or the duration of the door to stay open is matched to the amount of the items that need to be transferred to the container, the computation unit correlate the event of the opening and closing the door of the container to transferring the associated purchased items into the container by the user, and the items on the purchased list will be confirmed to be transferred to their associated container within the household. 202 is the camera for scanning the barcodes, taking images of the items and sending them to the computation unit for object recognition. Through the cameras which can be on 106, and/or be embedded on the side of the door of the containers 306, and/or inside the containers 307, the images of the items are captured for object recognition. Object recognition can be used toward automation of the process, and enhancing the accuracy, of updating the lists through including changes that happen within each event of opening and closing the door of the container. Use of cameras outside the container, might raise privacy issues; that might still be the case for the case of using cameras inside the container. In addition, the items inside the containers (that can be a refrigerator as an example for exemplary purpose, not limiting) might be placed on top of each other and hence, it will be impossible to perform object recognition. In this disclosure for solving these problems, the list of purchased items will be given as an input to the object recognizer unit as well. In this way, the object recognizer needs to assign a list of certain items to the items that are scanned by the cameras. Hence, the accuracy and speed of the object recognition will be increased tremendously. 203 is a speaker for communicating to the user and sending notifications. 204 is a touchscreen for showing the user notifications, information, lists of stored items, shopping lists, and receiving the user inputs. 205 is a barcode scanner, scanning the barcodes can also be accomplished by the use of cameras, and hence this unit is not be added to 106 if cameras are already in place. FIG. 2 B. illustrates the internal parts of 106, including memory, modem, and computational units. This apparatus is capable of receiving data from sensors that are inside the container, and controlling the status of some parameters of the container. As an explanatory example, not for the purpose of limiting, for a case that the container is a refrigerator, 106 can receive, from peripheral sensors, the value of temperature and humidity inside the refrigerator and adjust these parameters according to the items that are in the refrigerator, and/or their locations in the refrigerator. Note that 106 keeps track of what is inside the refrigerator and hence it can determine what the best ambient conditions are for storing the them. The central database, and computation unit might help computation and determination of the best ambient values and send the values to 106 to be transferred to the refrigerator's controller. 106 might not be needed as an interface between the refrigerator and the central database and computation unit if the refrigerator is capable of connecting to the network (is equipped with compatible devices). The refrigerator (or generally container, or storage) might be able to carry the sufficient data, computing power, and algorithm to compute optimization and do the adjustments in the ambient conditions locally as well. Based on the locations of different items inside the refrigerator (or generally container, or storage), the ambient conditions of different parts of the refrigerator can also be controlled separately for achieving the best and the most optimized condition for storing the items. The system can also send the user notifications and recommendations about on what part of the refrigerator (or generally container, or storage) each item is better to be placed to achieve the most optimized scheme in terms of storing the items to achieve highest freshness, longest storing time, highest energy saving, and so on.

FIG. 2 B. illustrates an explanatory example, for a case that the container is a refrigerator (as an example for exemplary purpose, not limiting), 106 can be placed somewhere near the refrigerator or be attached to the door of the refrigerator. When the user opens and closes the door of the refrigerator (or the container in general), 106 can detect the event of opening and closing the door of the refrigerator (or the container in general) through one or more of these sensors and methods:

1. Recognizing the sound of opening and closing the door, through sensor 304 B which is a switch which status changes through opening the door of the refrigerator,
2. Through cameras 306 B and 307 B,
3. Through motion detectors that can be embedded in 106.
4. Through sensors that are inside the refrigerator, or at the door of it. Such as the switch which is illustrated in 304B, light sensors, and so on.

As explained above, the event of the opening and closing the door of the refrigerator might be recognized as an event wherein the bulk grocery shopping has been transferred to the refrigerator. If not, and in general, the changes in the items within an event of opening and closing of the door of the refrigerator can be detected by one or more of these sensors and/or scenarios:

1. The inside cameras 307 B, through object detection, detect which item or items were taken out, and placed back, the difference in the amount of the object before and after the event is estimated through object detection and the amount of the object in the list is updated by the computation unit.
2. The inside cameras 307 B, through object detection, detect which item or items were taken out. For enhancing the accuracy of measurement of the changes in the item, the user places the item on the scale, 302B, which sends the measurement values to the central computation unit, and then the user places back the item to the refrigerator. The computation unit updates the current amount of the object in the list.
3. The case that there is a scale but no cameras. The user takes out an item and costumes part of it, before putting it back to the refrigerator, the user put it on the scale and then putting it back to the refrigerator. 106 asks the user which item was consumed in that event. Based on the user's response 106 updates the amount of the remaining of that item in the list through using the measurement values, obtained from the scale. In case the user has not used the scale, or items are measurable in integer quantities, such as eggs which numbers are more important than their weight, 106 asks about the amount of the item that was consumed in that event, or the amount that is remained after that event, and updates the list.
4. The case that there are no cameras, and no scale. For the sake of reducing the financial costs of implementation of this system, and being able to provide this system to all the social classes who might not have adequate financial resources to purchase expensive systems, and who might not be able to totally upgrade their current refrigerators, this scenario is defined and disclosed: The user takes out an item and place it back to the refrigerator. 106, which can be a regular voice assistance or a smartphone in this scenario, detects the opening and closing of the fridge through motion or sound sensors. It asks the user about the changes that happened within that event and updates the amount of the item in the list. In case 106, which can be a regular voice assistance or a smartphone in this scenario, and is not capable of automatically detecting the event of opening and closing the door of the refrigerator, the user can manually update the list with the new amount of the item through talking to 106, or entering the change through a keyboard.

If the user has taken out an expired object or an object that belongs to another user, 106 propagates a warning message to the user.

After updating the lists, the computation unit takes some or all of the following parameters toward optimization calculations: the amount of the remaining items and/or their expiration dates within a household (or any entity in general), the history of consumption of food, possible combinations of the ingredients for certain recipes, price of the items in different nearby stores, distance of the household or their workplace form those stores, their work schedule, the present and predicted traffic conditions, and so on, for suggesting optimized shopping lists and optimized dates and times of shopping trips. In case of calculation of optimized delivery schemes, the amount of the remaining items and expiration dates within a group of households that reside within a geographical vicinity, and availability of the supply chain and delivery vehicles, and etc. will also be taken into considerations.

As an exemplary example, but not limiting, the optimization helps to purchase sufficient amount of groceries. In the traditional scheme, sometime one item is purchased too little and hence it is finished before other items, and the user needs to travel to the store to get only that particular item. Sometimes an item is purchased too much and it passes expiration date without being consumed. Whereas if the items were purchased through an optimization scheme, all would be finished at the certain period of time, so that the user can do the grocery shopping with the least number of trips per a period of time.

Also, for reduction of food waste, the system can suggest recipes for the present time or the coming days based on what is left and/or based on expiration dates. Calculations toward making sure that the users are eating sufficient nutrition, can be performed by the system and reports in this regard can be sent to the users. The system can prepare shopping lists automatically based on the meal plans of the users. Economic reports on users spending can be prepared by the system. Financial advices toward reducing the costs, and food waste, can also be prepared by the systems and be sent to the users.

While the above description contains many specifications, these should not be construed as limitations on the scope of any embodiment, but as exemplification of the presently preferred embodiments thereof. Many other ramifications and variations are possible within the teachings of the various embodiments. For example, as demonstration of the feasibility of the invention, the process is performed and the results are shown for few samples as examples and for households and refrigerators. Thus, the scope of the invention should be determined by the appended claims and their legal equivalents and not by the examples given.

The invention claimed is:

1. A system considered for managing and optimizing shopping plans, and tracking a purchased item, or a plurality of purchased items, comprising:
   (a) a portable device, or a plurality of portable devices, comprising a memory and a central processing unit for receiving information from a user, or a group of users, and sending information to the user, or the group of users,
   (b) at least one central database comprising central computation units and digital storage units,
   (c) a first communication network for connecting said central database to said portable device,
   (d) at least one physical storage wherein the purchased items are stored by the user, or the group of users,
   (e) a second communication network,
   (f) at least one cashier system with capability of sending data to said central database via the second communication network,
   wherein at least one shopping list of the user, or the group of users, is stored in said central database and is editable through said portable device, or said plurality of portable devices, and is updated automatically each time each of the purchased items is entered into said physical storage or is taken out from said physical storage and wherein the items on the shopping list, or the plurality of the shopping lists, of the user, or the group of users, are updated automatically upon being purchased at the cashier system.

2. The system of claim 1, further comprising a sensing apparatus, or a plurality of sensing apparatuses, comprising:
   (a) central computation units,
   (b) digital storage units,
   (c) I/O peripherals for tracking the location of the purchased items, or the plurality of purchased items,
   whereby the purchased items that are entered to said physical storage are tracked such that remaining amount of each of the items is updated automatically each time the user takes each of the items out of said physical storage and returns the item to said physical storage.

3. The system of claim 2, wherein the locations of the items on the shopping list, or the plurality of the shopping lists, of the user, or the group of users, are updated automatically upon being placed in said physical storage.

4. The system of claim 2, further comprising an optimization algorithm stored in said central database, wherein remaining amount of the purchased items, or the plurality of purchased items, are updated automatically each time the user takes the purchased item, or the plurality of purchased items, out of said physical storage, or the plurality of physical storages, and returns the purchased item, or the plurality of purchased items, to said physical storage and the information about the amount of the remaining of the purchased items, or the plurality of purchased items, is sent to said central database and wherein the information about shopping patterns, consumption patterns, and amount of the purchased item, or the plurality of purchased items, in said physical storage, or said plurality of physical storages, of the user, or the group of users, are given to said optimization algorithm wherein an optimized shopping, or delivery, schedule for the user, or the group of users, is computed.

5. The system of claim 2, further comprising:
   (a) said sensing apparatus comprising at least one camera for automatically recording the items that are entered to said physical storage or are taken out from said physical storage,
   (b) automatic detection algorithms considered for detecting the items that are entered to said physical storage or are taken out from said physical storage and said automatic detection algorithms considered for detecting change in amount of said items, wherein the amount of each of the items recorded in the central database are updated automatically each time the user takes each of the items out of said physical storage and returns each of the items to said physical storage.

6. The system of claim 4, wherein the expiration dates and remaining amount of the items in the physical storage are evaluated and said shopping lists are updated by adding to said shopping lists the items that are close to be finished or are close to their expiration dates.

7. The system of claim 4, wherein the expiration dates and remaining amount of the items in the physical storage are evaluated and a notification is, or notifications are, sent to the user about the items that are close to be finished or are close to their expiration dates.

8. The system of claim 2, further comprising:
   (a) said portable device comprising peripherals for accessing to the global positioning system (GPS) for scanning a location of the user,
   (b) a digital map wherein a location of a store is, or locations of stores are, stored, wherein the location of the user is scanned and distance between the user and stores are computed and whereby, a notification is, or notifications are, or a reminder is, or reminders are, sent to the user about availability of the items that are on the shopping list in the store that is, or stores that are, within a certain vicinity from the user for purchase.

9. A system considered for managing shopping lists, comprising:
   (a) a portable device, or a plurality of portable devices, comprising a memory and a central processing unit for receiving information from a user, or a group of users, and sending information to the user, or the group of users,
   (b) at least one central database comprising central computation units and digital storage units,
   (c) a first communication network for connecting said central database to said portable device,
   (d) at least one physical storage wherein the purchased items are stored by the user, or the group of users,
   (e) a second communication network,
   (f) at least one cashier system with capability of sending data to said central database via the second communication network,
   (g) peripherals for accessing to the global positioning system (GPS) for scanning a location of the user, or the group of users, said peripherals embedded in said portable device, (h) a digital map wherein a location of a store is, or locations of stores are, stored, (i) a database wherein items that are sold by said stores are stored, (j) a database wherein a shopping list, or a plurality of shopping lists, of the user, or the group of users, are stored, wherein at least one shopping list of the user, or the group of users, is stored in said central database and is editable through said portable device, or said plurality of portable devices, and is updated automatically each time each of the purchased items is entered into said physical storage or is taken out from said physical storage and wherein the items on the shopping list, or the plurality of the shopping lists, of the user, or the group of users, are updated automatically upon being purchased at the cashier system and wherein the location of the user, or the group of users, is scanned and distance between the user, or the group of users, and the stores are computed and a notification is sent, or notifications are sent, to the user, or the group of users, via said portable device, or said plurality of portable devices, about availability of the items on the shopping lists in the stores that are within a certain distance from the user, or the group of users.

10. The system of claim 9, further comprising:

(a) a digital map wherein locations of items in a store are stored, wherein a shopping plan is provided to the user for an optimized walk between aisles in the store for collecting outstanding items that are on the shopping list.

11. The system of claim 10, wherein at least one option selected from the group consisting of (i) option of selecting the items that are on sale, or (ii) option of selecting the items that are the cheapest, or (iii) option of selecting the items that have received the best customer feedbacks, are given to the user to select from for automatically generating said shopping plan according to the option selected by the user.

12. The system of claim 2, further comprising automated algorithms for predicting the amount of perishable items in said physical container that will likely not be used before reaching their expiration dates.

13. The system of claim 12 wherein notifications are sent to the user about the items that will likely not be used before reaching the expiration dates so that the user consumes such items with priority.

14. The system of claim 12 wherein recipes are provided to the user for optimizing the utilization of the items that are likely to reach expiration dates before being consumed.

15. The system of claim 2, wherein at least one shopping list is automatically generated by use of intelligent or optimization algorithms according to shopping patterns and consumption patterns of the user, or the group of users.

16. The system of claim 15, wherein the generated shopping list includes optimized amounts of the items to be purchased so that the least amount of food waste occurs.

17. The system of claim 15, wherein the generated shopping list includes optimized amounts of the items to be purchased so that a healthy diet for the user, or the group of the users, be achieved.

18. A system considered for managing and optimizing shopping schedules and schedules of deliveries to a user, or a group of users, comprising:

(a) at least one central database comprising central computation units and digital storage units, (b) one physical storage, or a plurality of physical storages, wherein a group of purchased items are stored by the user, or the group of users, (c) a sensing apparatus, or a plurality of sensing apparatuses, comprising central computation units, digital storage units, I/O peripherals, for tracking the purchased items that are entered to said physical storage, (d) an optimization algorithm stored in said central database, wherein remaining amount of the purchased items are updated automatically each time the user takes, or the group of users take, each of the purchased items out of said physical storage, or the plurality of physical storages, and returns each of the purchased items to said physical storage, or the plurality of physical storages, and the information about the amount of the remaining of the purchased items is sent to said central database and wherein the information about shopping patterns, consumption patterns, and amount of the purchased item, or the plurality of purchased items, in said physical storage, or said plurality of physical storages, of the user, or the group of users, are given to said optimization algorithm wherein an optimized shopping, or delivery, schedule for the user, or the group of users, is computed such that said optimization algorithm computes and suggests to the user, or the group of users, an optimized amount for each of the items to be purchased, or be delivered, such that the user obtains each of the items with an optimized number of shopping, or delivery, trips such that the optimization algorithm optimizes the suggested amount for each of the items to be purchased by taking into consideration that an optimized number of the items be finished simultaneously at the same time such that by a least amount of shopping, or delivery, trips the optimized number of the items are purchased all at the same time.

19. The system of claim 18, wherein the information about supply chain is given to said optimization algorithm as an input parameter.

* * * * *